(12) United States Patent
Letelier

(10) Patent No.: US 7,404,924 B2
(45) Date of Patent: Jul. 29, 2008

(54) FLOTATION DEVICE

(75) Inventor: Carlos Q. Letelier, Allentown, PA (US)

(73) Assignee: FFE Minerals Corp., Bethlehem, PA (US)

( * ) Notice: Subject to any disclaimer, the term of this patent is extended or adjusted under 35 U.S.C. 154(b) by 0 days.

(21) Appl. No.: 10/753,151

(22) Filed: Jan. 7, 2004

(65) Prior Publication Data

US 2004/0188896 A1    Sep. 30, 2004

Related U.S. Application Data

(60) Provisional application No. 60/438,453, filed on Jan. 8, 2003.

(51) Int. Cl.
*C22B 13/08* (2006.01)
(52) U.S. Cl. ...................... 266/170; 266/169
(58) Field of Classification Search ................. 266/170; 209/169
See application file for complete search history.

(56) References Cited

U.S. PATENT DOCUMENTS 2,875,897 A * 3/1959 Booth .................... 209/169
5,591,327 A * 1/1997 Walters .................. 209/169
6,095,336 A * 8/2000 Redden et al. ............ 209/169
6,308,834 B1 * 10/2001 Peaker et al. ............. 209/169

* cited by examiner

*Primary Examiner*—Scott Kastler

(57) ABSTRACT

A flotation device for mixing and aerating an ore-containing slurry, comprising a tank having a conical-shaped floor. A vertically positioned flotation assembly is located within the tank. The open bottom of the flotation assembly is shaped is positioned above the conical portion of the floor. The assembly has a middle section having a cage with spaced, vertical bars forming its outer circumference. A rotatable impeller is located within the middle section which draws slurry from the tank through the bottom section and into the middle section and thereafter through the cage and out of assembly. The impeller is attached to a rotatable shaft which is connected at its bottom portion to the upper side of the back plate to rotate the impeller in a plane normal to the shaft. A hollow, vertically situated tubular shaped upper section is located directly above the middle section through which the shaft passes. The upper section has an opening at its lower end which is blocked by the back plate of the impeller.

15 Claims, 6 Drawing Sheets

FLOTATION DEVICE

CLAIM TO PRIORITY

The present application is a utility application for a "Flotation Device" claiming priority to U.S. Provisional Application Ser. No. 60/438,453 filed Jan. 08, 2003, the entire contents of which are incorporated herein by reference.

BACKGROUND OF THE INVENTION

This invention relates to mixing and aeration impellers, flotation assemblies in which the impellers are utilized, flotation cells in which the flotation assemblies are deployed, and flotation devices comprising the impeller, flotation assembly and flotation cell operating in combination. Specifically this invention provides a method and apparatus for mixing and aerating slurries processed in flotation devices to recover mineral values therefrom.

The mineral processing industry has found it necessary to treat ever-increasing amounts of lower and lower grade ores. This has required the use of correspondingly increasingly large processing equipment, including flotation devices. Consequently, there is a need for flotation devices that can more efficiently separate valued minerals, such as copper, from a ground ore.

Flotation devices typically operate as follows: a slurry is prepared from a ground mixture of ore and a liquid which is typically water with selected conditioning, collecting and frothing agents. The slurry is fed into a flotation device comprised of one or more flotation cells. In the flotation cells, means, for instance mechanical means such as impellers, are typically employed to aerate and physically mix the slurry. Aeration and mixing are desired to simultaneously produce bubbles in the slurry and to bring ore particles in contact with the bubbles. As is known, ore particles having desired mineral values tend to be carried to the surface of the slurry to form a froth which may be regarded as a concentrate of the desired mineral value to be recovered. Some particles, which tend to be the heavier particles which are frequently rich in the desired mineral value, tend to settle to the bottom of the flotation cell. In order to improve the efficiency of the flotation machine process it is desirable to thoroughly mix and suspend as many particles as possible in the slurry without overmixing or agitating which could reduce the opportunity for bubbles to transport desired particles to the surface.

BRIEF DESCRIPTION OF THE INVENTION

The present invention comprises a novel mechanical impeller, flotation assembly and flotation cell, which in combination provide a novel flotation device, for more effectively mixing a mineral-containing slurry to optimize the flotation process. The invention comprises in part an impeller for rotation by a shaft comprising a flat circular upper side and a flat circular lower side having a substantially cylindrical member that extends downward from the center of the lower side substantially perpendicular to the plane of the lower side. A plurality of radially extending vanes are affixed to the lower side of the impeller, wherein in a preferred embodiment the vanes have a trapezoidal shape, with the longer base of the trapezoid being affixed to and extending substantially the entire length of the cylindrical member, and with the shorter base of the trapezoid extending downward from the perimeter of the lower side of said impeller substantially perpendicular to the plane of the lower side. Preferably the vanes are regularly spaced radially about the perimeter of the impeller.

The shaft may be removably adapted to the impeller. The impeller rotates in a plane substantially normal to the shaft. The impeller preferably includes means to receive compressed air from a source and means to exhaust the compressed air from the lower side of the impeller. The cylindrical member may be formed to receive air from a hollow shaft and communicate it to one or more exits located on the lower side of the impeller.

The impeller is situated within a flotation assembly. The flotation assembly is positioned in a flotation cell which holds a volume of slurry. The flotation cell preferably has a conical shaped floor, above which the frustum shaped lower section of the flotation assembly is positioned. Slurry is drawn above the conical floor into the flotation assembly. In the flotation assembly, the slurry is mixed by the rotation of the impeller and aerated by the compressed air.

By utilizing the impeller and impeller assembly of the present invention, a slurry in a flotation cell may be agitated by rotating the impeller within the slurry to cause the slurry to be simultaneously directed radially outward from underneath the impeller. Because of the design of the impeller assembly of the present invention, there is little or no separate slurry flow currents above the impeller. By positioning the impeller assembly properly within a specifically designed flotation cell of the present invention, there is a suction of slurry from below the impeller, with the aerated slurry mixture traveling radially outward from the impeller.

BRIEF DESCRIPTIONS OF THE DRAWINGS

Like numerals in the drawings refer to like elements.

Figure 2:
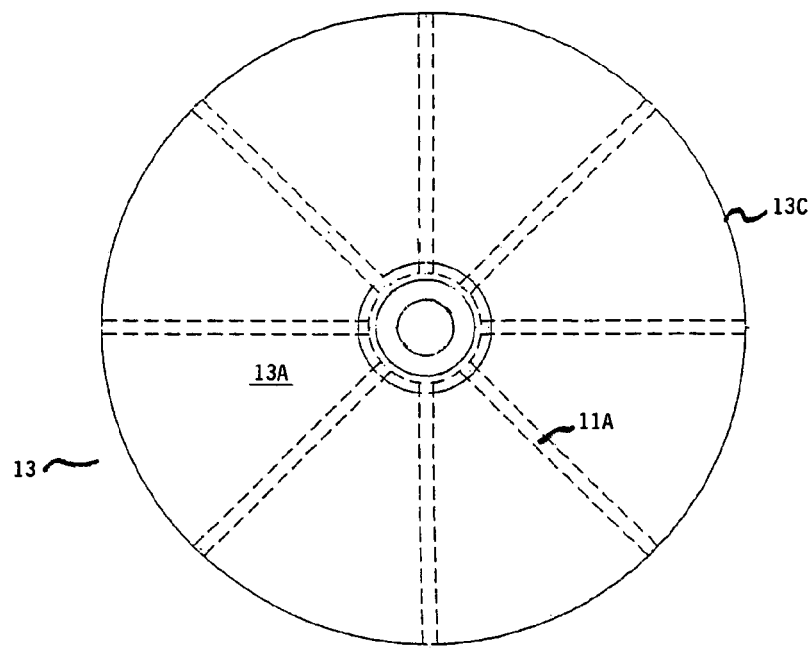
FIG. 2 is a top view of an impeller of the present invention, in which the blades are depicted in relief.
Figure 1:
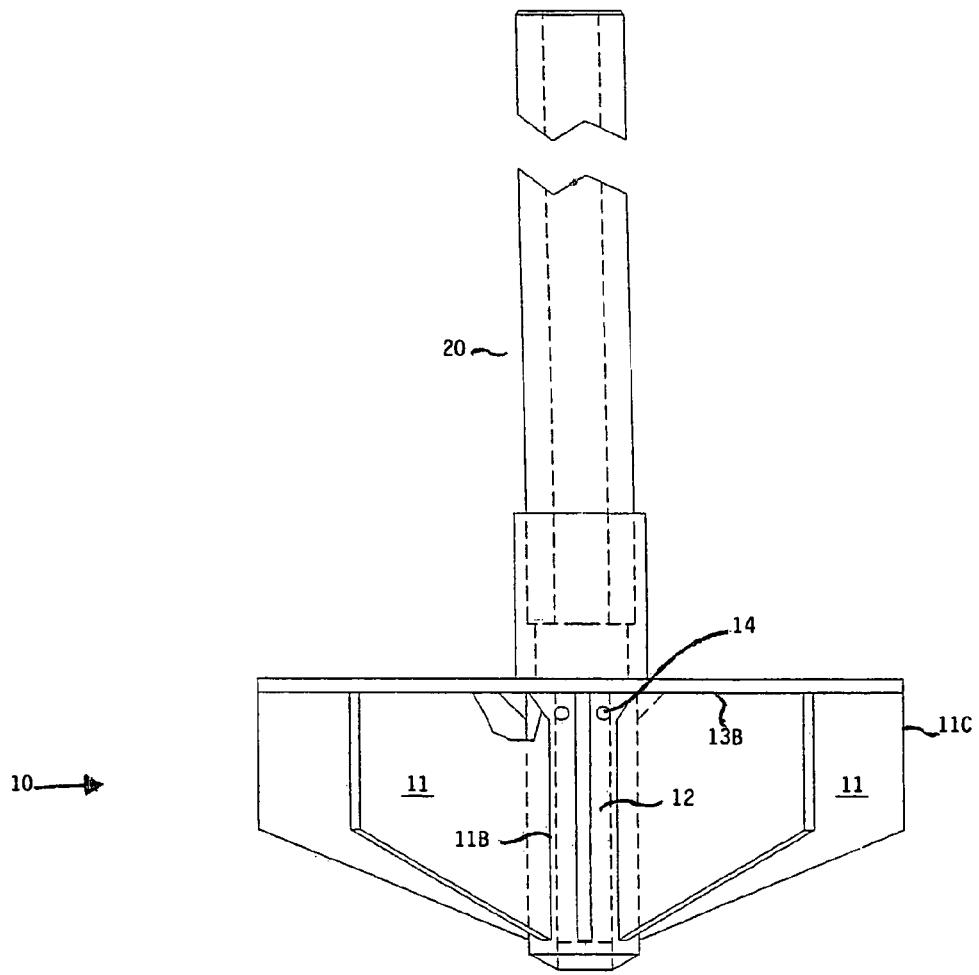
FIG. 1 is a segmented side view of an impeller of the present invention as attached to a shaft.

With reference to FIGS. 1 and 2, impeller 10 of the present invention is rotated by shaft 20 in a plane normal to shaft 20 and may be removably connected to shaft 20 by mechanical means (not shown), such as, for example bolts, keys or tapered locks. In the depicted embodiment, impeller 10 has eight blades 11 (four are depicted in FIG. 1) which extend radially from a hollow cylindrical central hub 12. Although the number of blades can vary based on the size of the desired flotation unit and other design criteria such as the material that is being processed, it is preferred that the blades be, no matter the number, evenly spaced from each other.

FIG. 2 is a top view of impeller 10 absent the shaft 20. Depicted in FIG. 2 is circular back plate 13 having top side 13A. Upper edge 11A (shown in relief) of impeller blade 11 is attached to the under side 13B of circular back plate 13.

In the depicted embodiment, the blades have the shape of a trapezoid, although other shapes may be utilized. The trapezoidal shaped impeller blade has parallel sides 11B and 11C, with the longer parallel side 11B being attached to central hub 12 and the shorter parallel side 11C extending downward from the outer circumference 13C of circular back plate 13.

In the preferred embodiment of the invention, shaft 20 is hollow and may be used as a conduit for pressurized air which will flow downward through the shaft in the direction of arrow A and into central hub 12, which preferably is also at least partially hollow. Central hub 12 preferably will have gas exit holes 14 through which pressurized air will exit radially underneath the back plate in the vicinity of its under side 13B and adjacent to blades 11.

Figure 3:
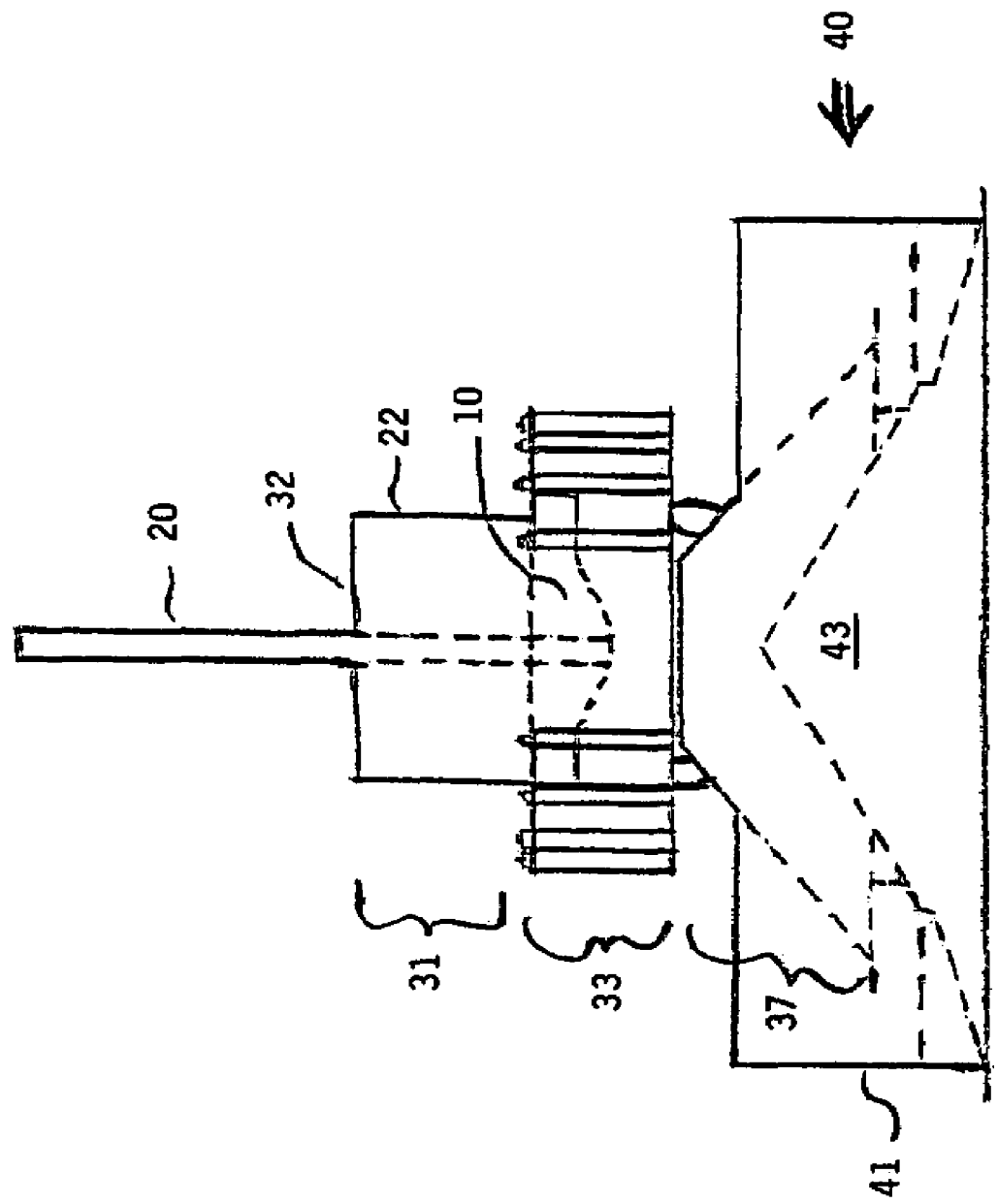
FIG. 3 is a side view of a flotation assembly of the present invention, in which an impeller of the present invention has been inserted, said flotation assembly being depicted in conjunction with a flotation cell of the present invention.
Figure 4:
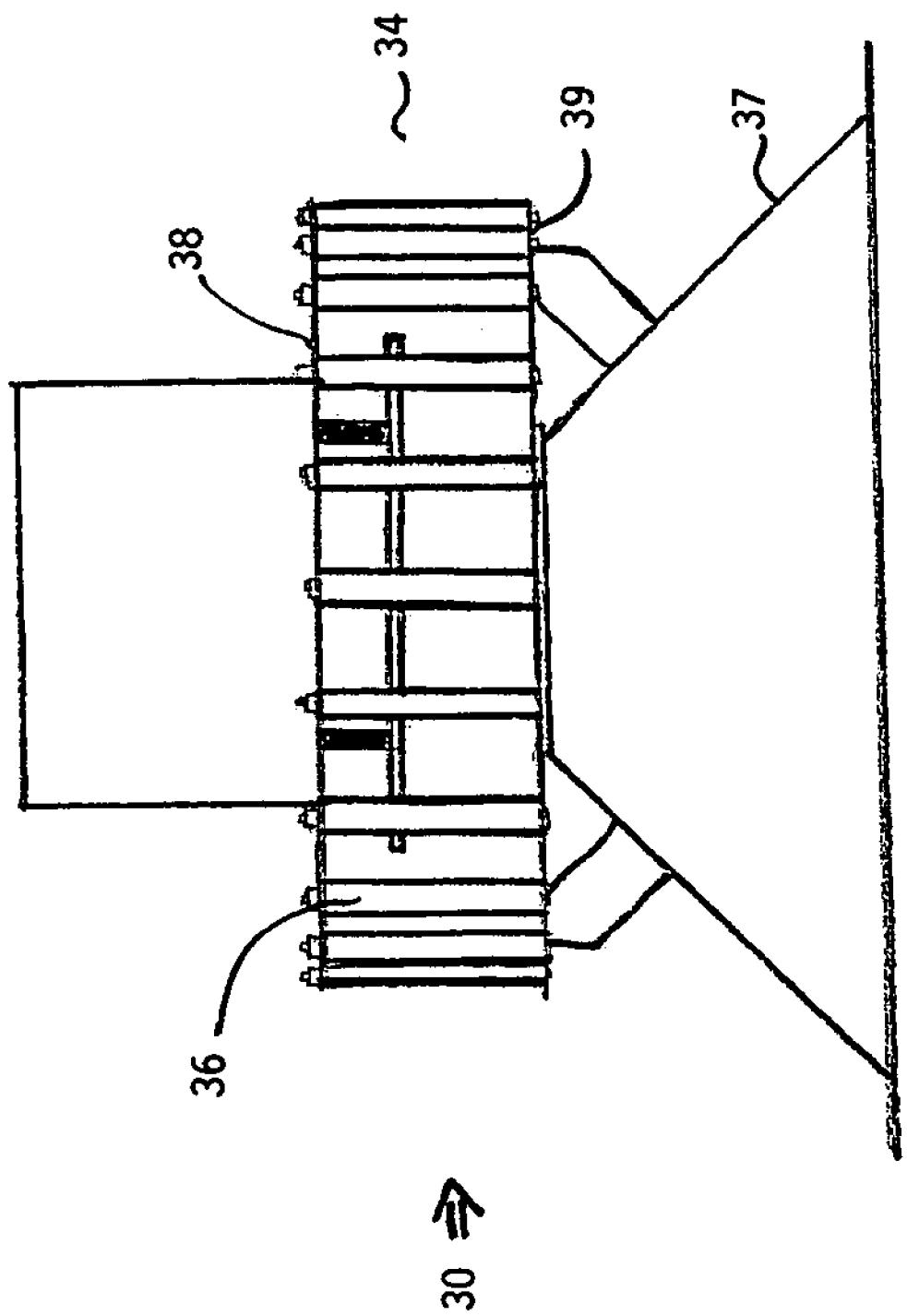
FIG. 4 is another side view of the flotation assembly of the present invention.

FIGS. 3 and 4 depict a flotation assembly 30 of the present invention. In FIG. 3 an impeller 10 attached to shaft 20 is inserted into flotation assembly 30. Assembly 30 is designed to be placed within a cylindrical flotation cell 40, the vertical sidewall 41 of which is partially depicted in FIG. 3.

Figure 5:
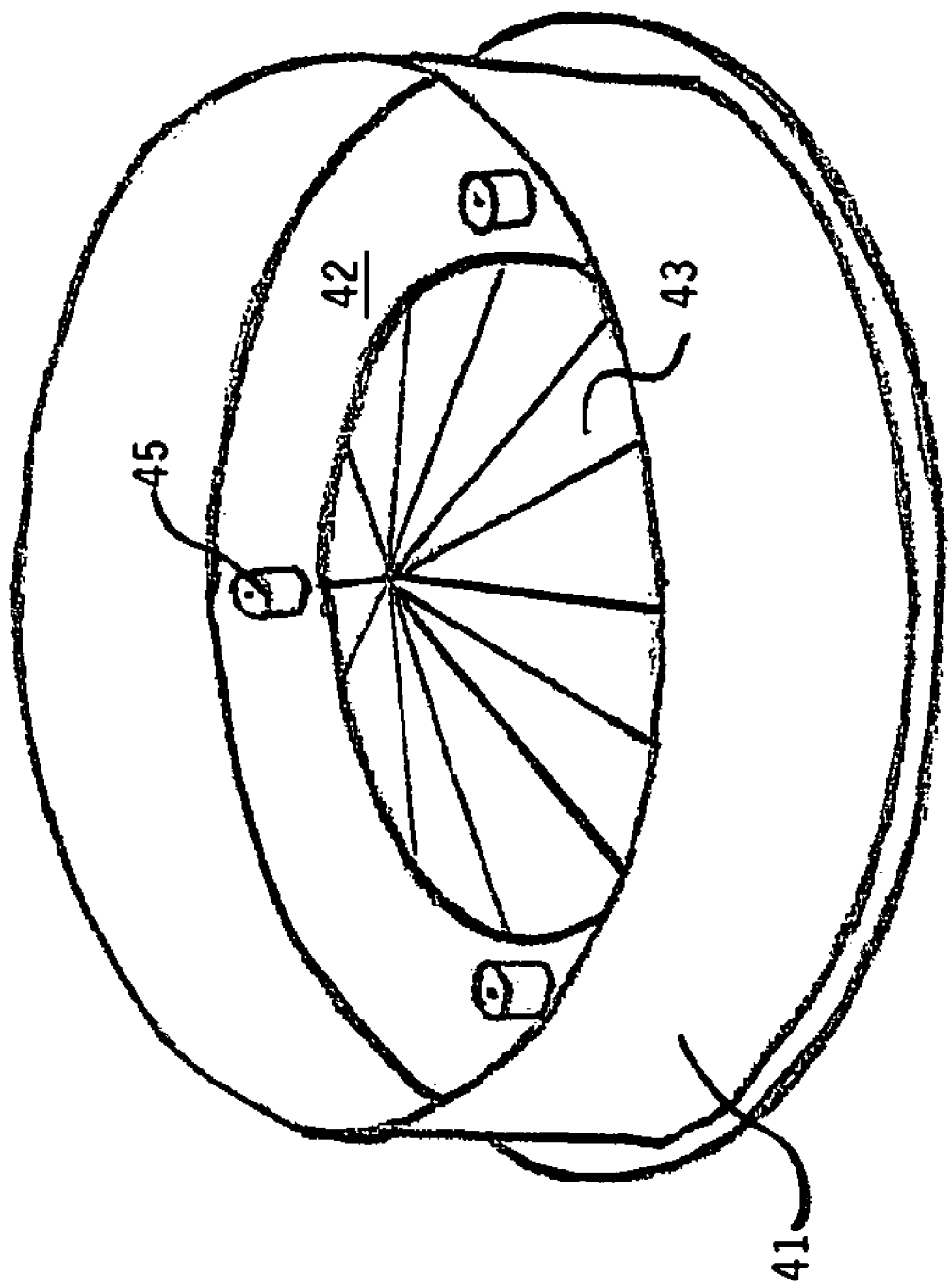
FIG. 5 is a top view of a flotation cell of the present invention.

As depicted in FIG. 5, flotation cell 40 has an outer floor portion 42 and, preferably, a cone shaped central floor portion 43. Alternatively, flotation cell 40 can have a flat floor.

Flotation assembly 30 is vertically positioned within flotation cell 40 and consists of (1) a hollow, preferably tubular shaped upper section 31 in which shaft 20 is located, said section 31 having an open upper end 32 and vertical wall 22, (2) hollow circular middle section 33, located directly below section 31, into which the impeller 10 is situated consisting in part of a circular cage 34 which forms the outer circumference of middle section 33 and (3) a hollow frustum shaped lower section 37 located directly below section 33 which is open at both its top and bottom and under which the slurry enters flotation assembly 30 and is eventually directed to the impeller. Cage 34 consists of a plurality of vertically situated bars or stator rods 36 between which the aerated slurry is expelled horizontally from the flotation mechanism. Middle section 33 is in direct fluid flow communication with lower section 37. Optionally, the flotation assembly of the present invention only need have middle (first) section 33 and lower (second) section 37.

Figure 6:
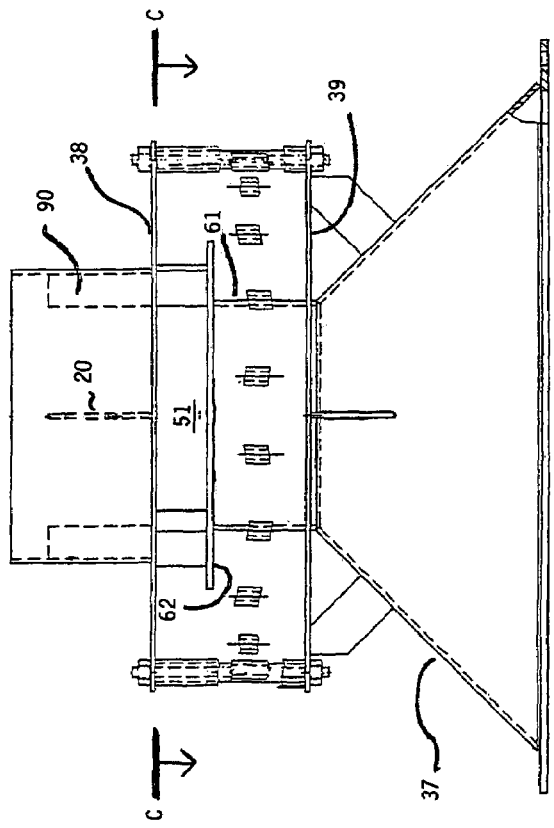
FIG. 6 is another side view of the flotation assembly of the present invention.

Referring further to FIG. 4 and to FIG. 6, the upper and lower boundaries of cage section 34, and therefore middle section 33, are defined by upper stator plate 38, which is located adjacent to the lower section of upper section 31 and lower stator plate 39, which is located adjacent to the upper end of section 37.

Extending vertically between the outer edges of upper stator plate 38 and lower stator plate 39 are a plurality of stator rods 36, which are preferably evenly spaced from each other around the outer circumference of the cage. Rods 36 are preferably tubular shaped, which, it has been discovered, aids in the agitation of the slurry. The size and number of rods 36 will depend on variables such as the size of the flotation device and the type of material being treated.

Enclosed by cage section 34 there is a hollow inner cylindrical member 61, the wall of which extends upward from the top of section 37 to ledge 62, which ledge 62 extends tangentially out from the top end of cylindrical member 61. Typically, inner cylindrical member 61 extends vertically at least one half the distance from lower stator plate 39 to upper stator plate 38. The remaining vertical portion of cage section 34, that is, the distance from the top surface of ledge 62 to the bottom surface of upper stator plate 38 is an open "window" area 51 through which aerated slurry exits the interior of the flotation unit. The distance between ledge 62 and upper stator plate 38, that is, the height of "window" 51, is approximately equal to the length of the short parallel side 11C of impeller 20.

FIG. 5 is a top view of an empty flotation cell 40 of the present invention, that is, a flotation cell without the flotation assembly. Depicted are wall 41, outer floor 42, inner conical floor 43 and spacers 45, on which flotation assembly 30 is supported.

Figure 7:
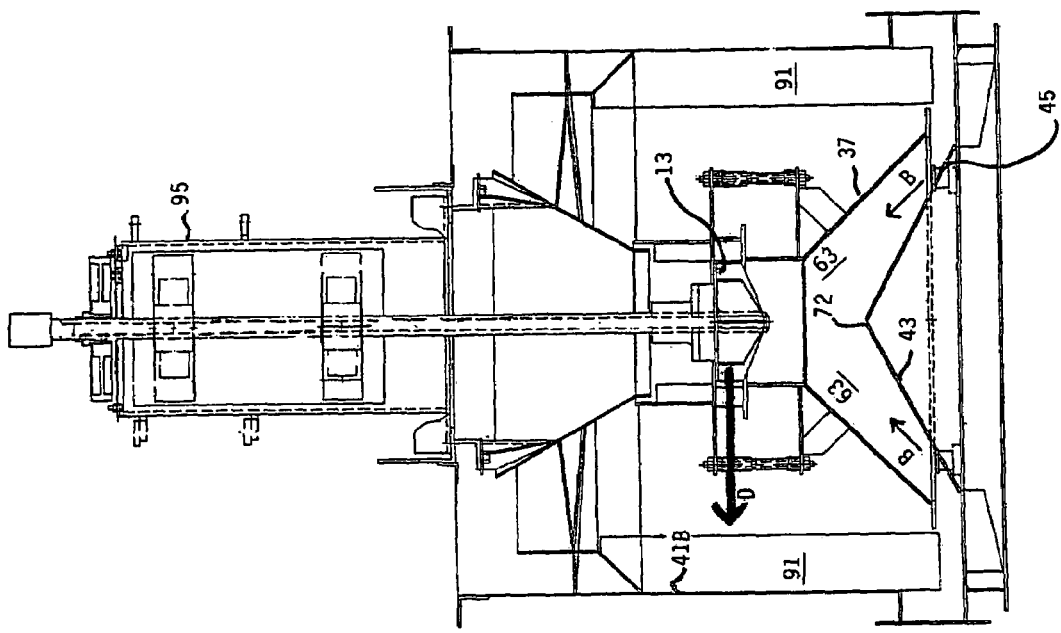
FIG. 7 is a side view of a flotation device of the present invention comprising a motor driven impeller, a flotation assembly and a flotation cell.

With reference to FIG. 7, slurry to be treated is drawn into flotation assembly 30 from underneath lower section 37 by the rotation of impeller 10 and travels upward in the direction of arrows B. The use of conical central floor 43, particularly when lower section 37 of flotation assembly 30 is centered directly above said conical central floor 43, serves to help direct the slurry upward through flotation assembly 30. The slurry is drawn into the middle section 33 where it is agitated by the rotating impeller and aerated. Impeller 10 is rotated by shaft 20 which is driven by motor 95. The aerated slurry exits the flotation assembly 30 horizontally through "window" area 51 after which it passes outward and between stator rods 36 in the direction of arrows D. In the flotation device of the present invention slurry to be treated enters the assembly from underneath conical lower section 37 and exits the mechanism via the "window" 51 in the cage area. Slurry typically will not enter or leave the mechanism from the upper section 31 when the mechanism is in use, since when the impeller is positioned within flotation assembly 30 back plate 13 of the impeller will essentially block opening 80 between section 33 and upper section 31 to prevent fluid from passing from middle section 33 into upper section 31. In one embodiment back plate 13 of the impeller will be underneath (as shown in FIG. 7), adjacent to and overlap opening 80 or will be closely fitted to the opening 80.

The present invention encompasses a means to create a restricted flow passage underneath bottom section 37 through which fluid is directed to the interior of the middle section 33 and ultimately impeller 10. This is accomplished by a central floor portion 43 of flotation cell 40 being cone shaped and flotation assembly 30 being positioned preferably directly over the apex 72 of central floor portion 43, to thereby form an annular flow passage 63 between the surface of the inner cone and the inner surface of the conical section. Lower section 37 is spaced above the cone-shaped floor 43 by spacers 45. Alternatively the flotation assembly of the present invention may contain a second inner cone fitted underneath the lower section 37. In another embodiment frustum section 37 need not be hollow but can have a plurality of passageways for the slurry leading from the bottom of the section to the upper end of section 37 adjacent to hollow middle section 33.

Figure 8:
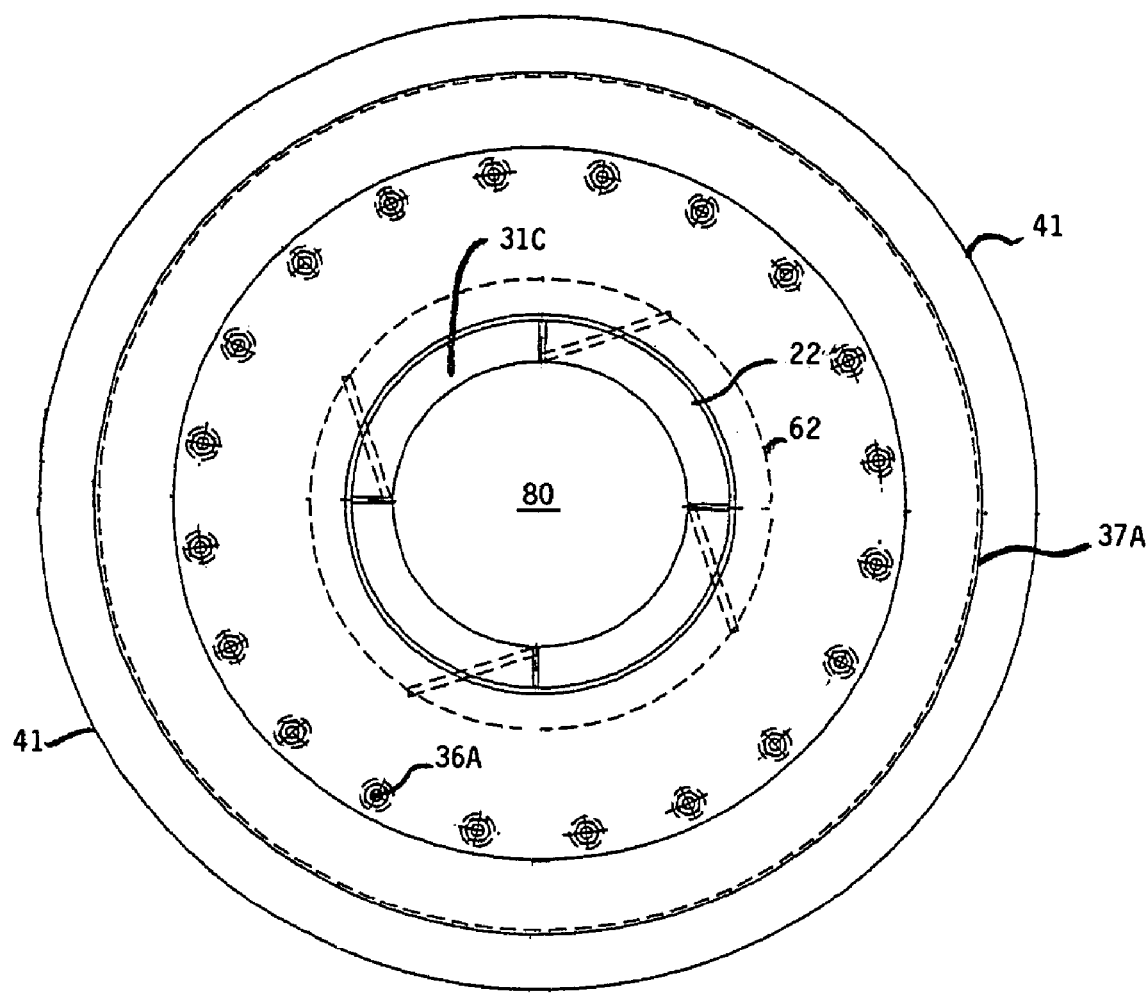
FIG. 8 is a top view of the flotation device of the present invention looking down from lines C-C in FIG. 6.

As shown in FIG. 8, at the bottom of hollow section 3, and consequently at the top of middle section 33 there is an opening 80 which is smaller in diameter than the diameter of hollow section 31, and consequentially at the bottom of upper conical section 31 there is a rim 31C that extends at right angles from wall 22. In one embodiment the diameter of opening 80 is only slightly larger than the diameter of plate 13 of impeller 10. Therefore, when impeller 10 is inserted in flotation assembly 30, the upper surface 13A of the impeller backplate 13 will be planar with rim 31B, thereby effectively preventing fluid from entering middle section 33 of the flotation assembly 30 from above, that is via upper section 31 and also preventing fluid from passing from middle section 33 to upper section 31. Also depicted in FIG. 8 are ledge 62 (in relief), the top 36A of stator rods 36, outer edge 37A of bottom conical section 37, and side wall 41 of flotation cell 40.

The inner wall 31B of upper section 31 has a plurality of vertically positioned rectangular vanes 90 that extend radially therefrom.

Vanes 90, which preferably are evenly spaced from each other, serve to break up any vortices that would result from the rotation of the impeller. Likewise, the inner walls 41B of flotation cell 40 may also optionally contain a plurality of vertically positioned baffles 91 which extend radially from said inner wall. These baffles tend to break up any eddies or vortices within the cell which would reduce the efficiency of the flotation cell.

While there are shown and described present preferred embodiments of the invention, it is distinctly to be understood that the invention is not limited thereto, but may be otherwise variously embodied and practiced within the scope of the following claims.

The invention claimed is:

1. A flotation device for mixing an ore-containing slurry, comprising a tank including a floor and vertical side walls to maintain a level of slurry therein, wherein a portion of the floor is conical-shaped; a vertically positioned flotation assembly located within the tank having a lower, middle and upper section, wherein the lower section of the flotation assembly is shaped as an upright hollow frustum having an open top and an open bottom which is positioned above the conical portion of the floor; a circular middle section located directly above said lower section having a cage with spaced, vertical bars forming its outer circumference, within which middle section there is a rotatable impeller which, upon rotation, draws slurry from the tank through the bottom section and into the middle section and thereafter propels the slurry through the cage and out of the middle section.

2. The flotation device of claim 1 wherein the bars are tubular shaped.

3. The flotation device of claim 1 wherein the inner side walls of the tank contain a plurality of vertically positioned baffles which extend radially from said inner side wall.

4. A flotation device for mixing an ore-containing slurry, comprising a tank including a floor and vertical side walls to maintain a level of slurry therein; a vertically situated flotation assembly located within the tank having a lower, middle and upper section, wherein the lower section of the flotation assembly has an open top and an open bottom; a circular middle section located directly above said lower section having a cage with spaced bars forming its outer circumference, within which middle section there is a rotatable impeller having a back plate with an upper side and a lower side, said impeller being attached to a rotatable shaft which is connected at its bottom portion to the upper side of the back plate to rotate the impeller in a plane normal to said shaft; and a hollow, vertically situated tubular shaped upper section located directly above said middle section through which the shaft passes, there being an opening between said upper section and said middle section which is blocked by the back plate of the impeller.

5. The flotation device of claim 4 wherein the bars are tubular shaped.

6. The flotation device of claim 5 wherein the inner side walls of the tank contain a plurality of vertically positioned baffles which extend radially from said inner side wall.

7. A flotation device for mixing an ore-Containing slurry, comprising a tank including a floor and vertical side walls to maintain a level of slurry therein, wherein a portion of, the floor is conical-shaped; a vertically positioned flotation assembly located within the tank having a lower, middle and upper section, wherein the lower section of the flotation assembly is shaped as an upright hollow frustum having an open top and an open bottom which is positioned above the conical portion of the floor; the circular middle section is located directly above said lower section having a cage with spaced, vertical bars forming its outer circumference, within which middle section there is a rotatable impeller having a back plate with an upper side and a lower side, which impeller, upon rotation, draws slurry from the tank through the bottom section and into the middle section and thereafter propels the slurry through the cage and out of the middle section, said impeller being attached to a rotatable shaft which is connected at its bottom portion to the upper side of the back plate to rotate the impeller in a plane normal to said shaft; and a hollow, vertically situated tubular shaped upper section located directly above said middle section through which the shaft passes, there being an opening between said upper section and said middle section which is blocked by the back plate of the impeller.

8. The flotation device of claim 7 wherein the bars are tubular shaped.

9. The flotation device of claim 7 wherein the inner side walls of the tank contain a plurality of vertically positioned baffles which extend radially from said inner side wall.

10. A flotation device for mixing and aerating an ore-containing slurry, comprising a tank including a floor and vertical side walls to maintain a level of slurry therein, wherein a portion of the floor is conical-shaped; a vertically positioned flotation assembly located within the tank having a lower, middle and upper section, wherein the lower section of the flotation assembly is shaped as an upright hollow frustum having an open top and an open bottom which is positioned above the conical portion of the floor; a circular middle section located directly above said lower section having a cage with spaced, vertical bars forming its outer circumference, within which middle section there is a rotatable impeller, which impeller, upon rotation, draws slurry from the tank through the bottom section and into the middle section and thereafter propels the slurry through the cage and out of the middle section, said impeller being attached to a rotatable shaft which is connected at its bottom portion to the upper side of the back plate to rotate the impeller in a plane normal to said shaft: and a hollow, vertically situated tubular shaped upper section located directly above said middle section through which the shaft passes, there being an opening between said upper section and said middle section; said impeller further comprising (i) a back plate having a circular upper side and a flat circular lower side having a substantially cylindrical member extending downward from the center of the lower side substantially perpendicular to the plane of the lower side;

(ii) a plurality of radially extending vanes affixed to the lower side of said back plate of said impeller, wherein the vanes have a trapezoidal shape, with the longer base of the trapezoid being affixed to and extending substantially the entire length of the cylindrical member, and with the shorter base of the trapezoid extending downward from the perimeter of the lower side substantially perpendicular to the plane of said lower side;

(iii) a shaft to rotate the impeller in a plane normal to said shaft, said shaft being connected to the upper side of the back plate and having means to transmit compressed gas underneath the back plate;

wherein said opening is blocked by the back plate of the impeller.

11. The flotation device of claim 10 wherein the bars are tubular shaped.

12. The flotation device of claim 10 wherein the inner side walls of the tank contain a plurality of vertically positioned baffles which extend radially from said inner side wall.

13. A flotation device for mixing an ore-containing slurry, comprising a tank including a floor and vertical side walls to maintain a level of slurry therein, wherein a portion of the floor is conical-shaped; a vertically positioned flotation assembly located within the tank having a first and section section, wherein the first section of the flotation assembly is shaped as an upright hollow frustum having an open top and an open bottom which is positioned above the conical portion of the floor; a circular second section located directly above said lower section having a cage with spaced, vertical bars forming its outer circumference, within which second section there is a rotatable impeller having a back plate with an upper side and a lower side, which impeller, upon rotation, draws slurry from the tank through the first section and into the second section and thereafter propels the slurry through the cage and out of the second section, said impeller being attached to a rotatable shaft which is connected at its bottom portion to the upper side of the back plate to rotate the impeller in a plane normal to said shaft; said second section having an opening at its upper end which is blocked by the back plate of the impeller.

14. The flotation device of claim 13 wherein the bars are tubular shaped.

15. The flotation device of claim 14 wherein the inner side walls of the tank contain a plurality of vertically positioned baffles which extend radially from said inner side wall.

* * * * *